United States Patent [19]

Shimizu

[11] 4,225,219
[45] Sep. 30, 1980

[54] CAMERA WITH AUTOFOCUSING DEVICE

[75] Inventor: Ichiro Shimizu, Kawasaki, Japan

[73] Assignee: Canon Kabushiki Kaisha, Tokyo, Japan

[21] Appl. No.: 967,871

[22] Filed: Dec. 8, 1978

[30] Foreign Application Priority Data

Dec. 26, 1977 [JP] Japan ............................... 52/159116

[51] Int. Cl.³ ...................... G03B 13/22; G03B 17/18
[52] U.S. Cl. ....................................... 354/25; 354/197;
354/198; 354/199; 354/286
[58] Field of Search ................. 354/25, 195, 197, 198,
354/199, 295, 286; 352/140, 142, 170, 171

[56] References Cited

U.S. PATENT DOCUMENTS

| | | | |
|---|---|---|---|
| 3,914,034 | 10/1975 | Komine | 352/142 |
| 3,940,777 | 2/1976 | Komine | 354/197 |
| 3,962,711 | 6/1976 | Cutler, Jr. | 354/295 |
| 4,057,327 | 11/1977 | Kumazawa | 354/195 X |
| 4,083,057 | 4/1978 | Quinn | 354/25 |
| 4,153,903 | 8/1979 | Pizzuti et al. | 354/195 |

*Primary Examiner*—L. T. Hix
*Assistant Examiner*—William B. Perkey
*Attorney, Agent, or Firm*—Toren, McGeady and Stanger

[57] ABSTRACT

In a camera having a photo-taking lens adapted to be preceded by an attachment lens to effect a change in focal length, an autofocusing device whose distance measuring portion operates with an optical system outside the photo-taking lens. The autofocusing device is provided with a sensing device responsive to the detection of the attachment lens for excluding the operation of the automatic focus adjustment from the focusing mechanism for the photo-taking lens.

13 Claims, 8 Drawing Figures

CAMERA WITH AUTOFOCUSING DEVICE

BACKGROUND OF THE INVENTION

1. Field of the Invention

This invention relates to autofocusing cameras having a distance measuring portion which operates with an optical system outside the photo-taking lens. More particularly, the invention relates to a device for permitting selective control of automatic and visual focusing of such cameras dependent upon the absence and presence of an attachment lens at the front of the photo-taking lens.

2. Description of the Prior Art

Many methods for controlling automatic focusing of a camera have been proposed, of which three examples are typical. The first example has a focus adjustment which is effected by detecting the sharpness of an image of an object to be photographed. The second example employs a signal (an ultrasonic wave, for example) which is projected to the object and the reflected signal from the object is received in a time interval based on which the camera-to-object distance is determined to effect automatic adjustment of the fucusing. Finally, another such example makes use of a distance meter whose principle is similar to that employed in trigonometrical surveying. To realize these methods in a camera, a portion of light passing through the photo-taking lens may be utilized in measuring the camera-to-object distance to provide a so-called "TTL distance measuring type automatic focusing adjusting device" (TTL mode). Alternatively, without use of the photo-taking lens, distance information may be obtained through an optical system provided separately from the photo-taking lens, the latter being a so-called "outside-the-lens distance measuring type automatic focus adjusting device" (OTL mode).

For the purpose of broadening photographic capabilities, an optical accessory such as a closeup lens or wide angle lens for attachment is often used on the front end of a mechanical mounting of the photo-taking lens. In the case of a camera whose distance measuring portion operates in the TTL mode, since the degree of focus of an image for distance measurement is made equivalent to that of focus thereof at the film plane independently of whether or not the attachment lens is used, the accuracy and reliability of the autofocusing device are not reduced to any extent by the use of the attachment lens. In the case of the camera operating in the outside-the-lens distance measuring mode, however, since the operating mechanism for the distance measuring optical system is mechanically linked to the autofocusing mechanism in a predetermined relation, the attachment lens contributes to the lack of sharpness of the image at the film plane. It will be evident that the outside-the-lens distance measuring autofocusing camera must be provided with a device for permitting visual focusing while the autofocusing device is excluded when the attachment lens is used.

SUMMARY OF THE INVENTION

An object of the present invention, therefore, is to provide a camera having a photo-taking lens receptive of an optical accessory for changing the focal length on the front end of a mechanical mounting for the photo-taking lens with an auto-focusing device operating in an outside-the-lens distance measuring mode and arranged upon detection of the presence of the optical accessory to be no longer effective so that visual focusing of the photo-taking lens can be performed to assure the condition of sharpest focus at the film plane.

Another object of the present invention is to provide an autofocusing camera of the character described just above with means for releasing the mechanical mounting from operative connection with the autofocusing mechanism in automatic response to the attachment of the optical accessory to the photo-taking lens, and, after the removal of the accessory, for automatically re-establishing the operative connection between the mechanical mounting and the autofocusing device.

In accordance with the present invention, a camera having a photo-taking lens mounting mechanism which is receptive of an optical accessory for effecting a change in focal length at the front end thereof, comprises a photo-taking lens mounting mechanism having a photo-taking lens optical system, focus adjusting means for performing focus adjustment of said photo-taking lens optical system, the focus adjusting means being manually operable, and coupling means for selectively mounting and de-mounting said optical accessory. Also included are automatic focus adjustment means for automatically detecting a distance from the camera to an object to be photographed and for automatically controlling operation of said focus adjustment means. The automatic focus adjustment means have a distance measuring optical system arranged on an optical axis different from the optical axis of the photo-taking lens optical system, a control circuit means responsive to a signal representative of the distance from the distance measuring optical system for producing a control signal, said drive means responsive to the control signal from the control circuit for driving, the drive means being operatively connected to the focus adjusting means. Finally included are detecting and change-over means responsive to the detection of the presence of the optical accessory at the coupling means for operatively excluding the operation of the automatic focus adjustment means.

For a better understanding of the present invention, reference is made to the following description and accompanying drawings, while the scope of the present invention will be pointed out in the appended claims.

DESCRIPTION OF THE PREFERRED EMBODIMENTS

Figure 1:
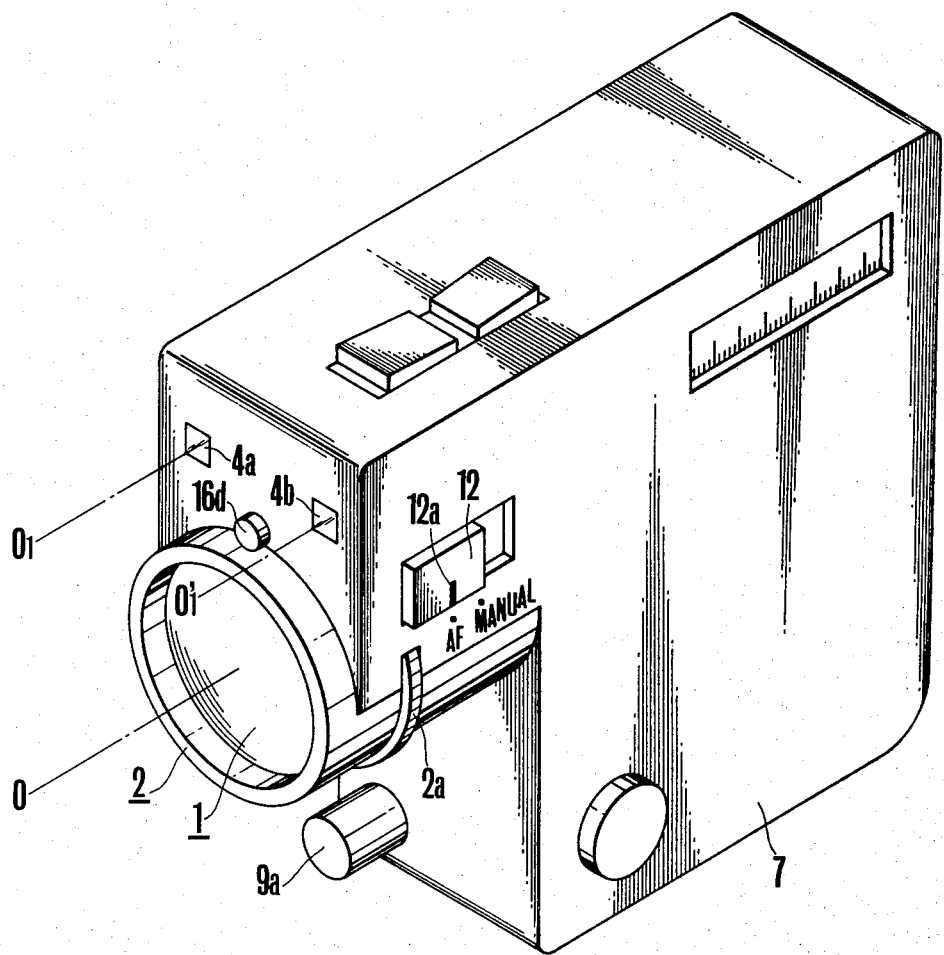
FIG. 1 is a perspective view of one embodiment of a cinematographic camera capable of selectively controlling the automatic and visual focusing of a photo-taking lens according to the present invention.
Figure 2:
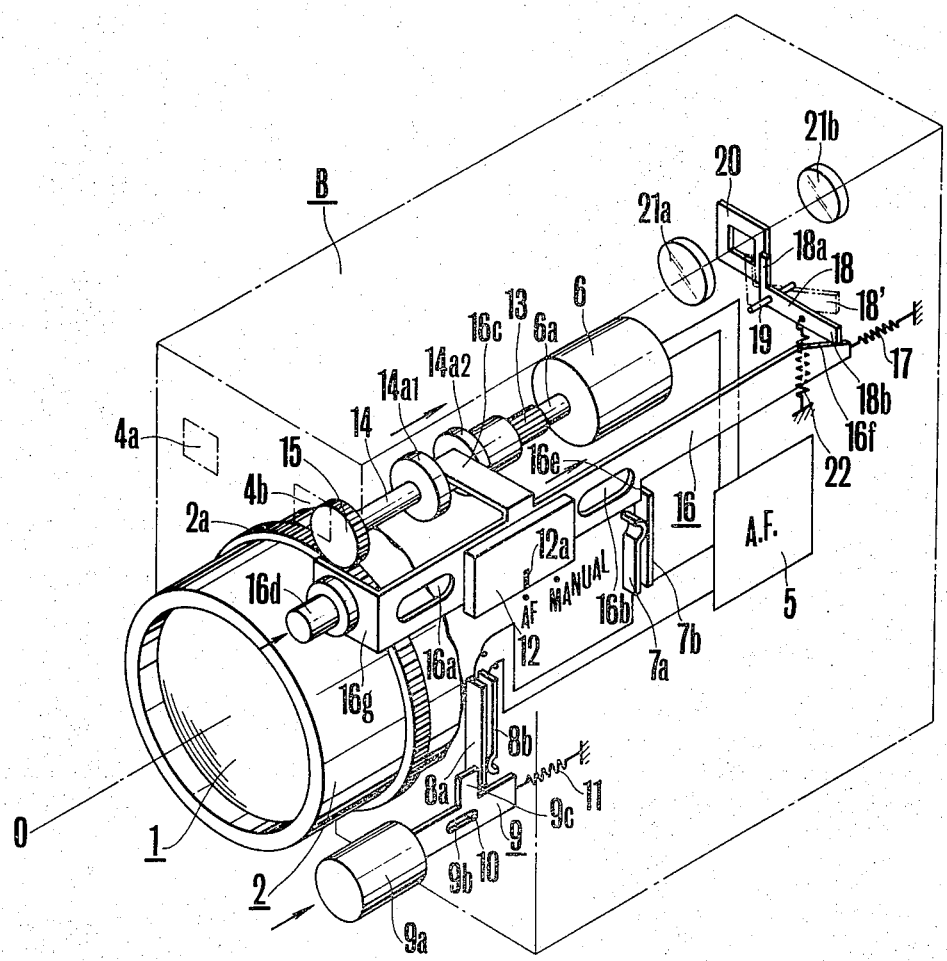
FIG. 2 is a schematic, perspective view of the basic parts of a focusing mode selecting device of FIG. 1.

Referring initially to FIGS. 1 through 4, there is shown one embodiment of an autofocusing cinematographic camera according to the present invention. The camera includes a photo-taking lens 1 in a mechanical mounting 2 having a focusing ring 2a rotatable with reference to a camera housing B. The front end of the internal surface of the focusing ring is screw-threaded to bear an optical accessory or attachment lens 23 in fixedly secured relation. A pair of windows 4a and 4b for a distance measuring optical system are formed in portions of a front panel of the housing B so that two optical axes $O_1$ and $O_1'$ of the system are laterally spaced apart from each other and are differentiated in position from the optical axis O of the photo-taking lens 1. The distance measuring optical system cooperates with an automatic sharpest focus detecting circuit A.F. in block 5 to control operation of a reversible motor 6 when two series-connected switches 7 and 8 are simultaneously closed.

The lowermost portion of the housing B is offset rearwardly of the front panel to accommodate a release button 9a on the front end of a slide 9. When the release button 9a is depressed rearwardly against the force of an expansion spring 11 as is guided by a pin 10-and-slot 9b connection, a slide tab 9c is acted on a movable contact 8a, causing the normally open switch SW8 to be closed. At the same time, another switch (not shown) controlling operation of a shutter and filmstrip feeding mechanism (not shown) is also closed.

Figure 4:
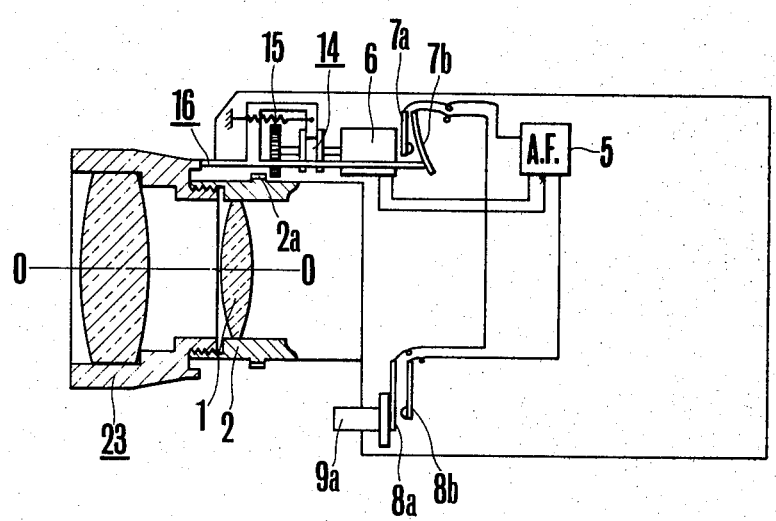

An automatically or manually operated focusing mode selector includes a slide 16 having two longitudinally elongated slots 16a and 16b in which respective pins (not shown) fixedly mounted on a framework of the camera are engaged to permit longitudinal movement of the slide 16. The slide 16 has a tab 16c projecting into a space between two collars 14a1 and 14a2 on a common shaft 14 near the rear end thereof, the front end of which fixedly carries a gear 15 arranged to engage with a geared portion 2a on the outer peripheral surface of the focusing ring when a control element 12 is moved by the action of an expansion spring 17 to place an index mark 12a on the surface thereof in registry with a symbol "AF" (autofocusing mode). The slide 16 is provided with a probe 16d fixedly mounted on a rectangularly bent-off portion 16g and projecting through a slidingly fitted hole in the front panel of the housing B and outwardly beyond it to such an extent so that when the optical accessory or attachment lens 23 is mounted on the front end of the focusing ring in a predetermined position as shown in FIG. 4, the slide 16 is moved to the right. This causes the gear 15 to be disengaged from the geared portion 2a, and also causes the switch SW7 to be opened by the edge of a cutout 16e engaging a movable contact 7b. Accordingly, the depression of the release button 9a does not lead to actuation of the autofocusing device.

To indicate that the camera is set in the visual focusing mode, there is provided a display device including a lever 18 pivotally mounted on a pin 19 which is fixedly mounted on the camera housing B, a tension spring 22 connected between the housing B and the center of the lever 18 to urge the lever end 18b for normally abutting engagement on a tapered portion 16f of the focusing mode selector slide 16 so that rearward movement of the slide 16 is transmitted to lever 18 and results in counterclockwise movement of lever 18, and a display element in the form of a projection 18a extending from the opposite end of the lever 18 into the field of view of a finder defined by a focusing aperture mask 20 when in the visual focusing mode. The finder includes lens elements 21a and 21b for focusing a fraction of the light passing through the photo-taking lens 1 to form an image of equivalent sharpness to that of an image formed on a film plane (not shown). Looking through the finder, the operator is able to control the focusing of the photo-taking lens with high accuracy regardless of the presence of the optical accessory 23, which may be a closeup lens or a wide angular attachment lens. The provision for disengaging the gear 15 from the focusing ring when in the visual focusing mode facilitates minimization of the driving torque of the focusing ring.

Figure 3:
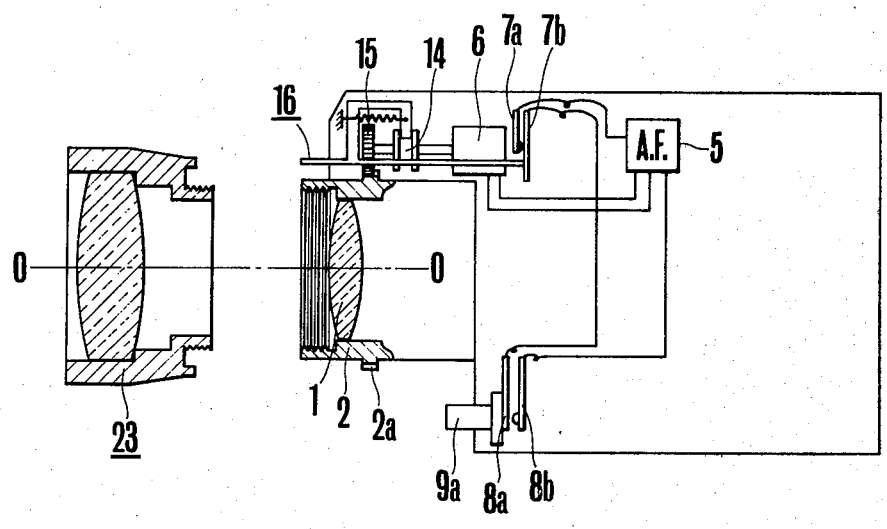
FIGS. 3 and 4 are schematic, partly sectional, partly elevational views of the camera of FIGS. 1 and 2 in two different operative positions with an attachment lens about to be mounted and effectively mounted on the front of the photo-taking lens respectively.

When the optical accessory 23 is removed from the mechanical mounting for the photo-taking lens 1, the slide 16 is automatically moved to the left under the action of the spring 17. In this manner, the display element 18a is retracted from the field of view and the gear 15 is brought into engagement with the geared portion 2a, while an internal gear on the shaft 14 is moved in sliding engagement with a pinion 13 on an output shaft 6a of the motor 6. At the same time, the switch SW7 is closed as shown in FIG. 3. Thus, the camera is switched to the automatic focusing mode. With the camera in this state, when the release button 9a is depressed in the direction indicated by an arrow, the switch SW8 is closed to actuate the autofocusing device. The output of the automatic sharp focus detecting circuit 5 drives the motor 6 for rotation in either direction, and motion of the output shaft 6a is transmitted through the pinion 13-and-integral gear 14 to the gear 15 by which the focusing ring 12 is rotated to move the front member of the photo-taking lens 1 along the optical axis O until a condition of sharp focus is detected.

Figure 5:
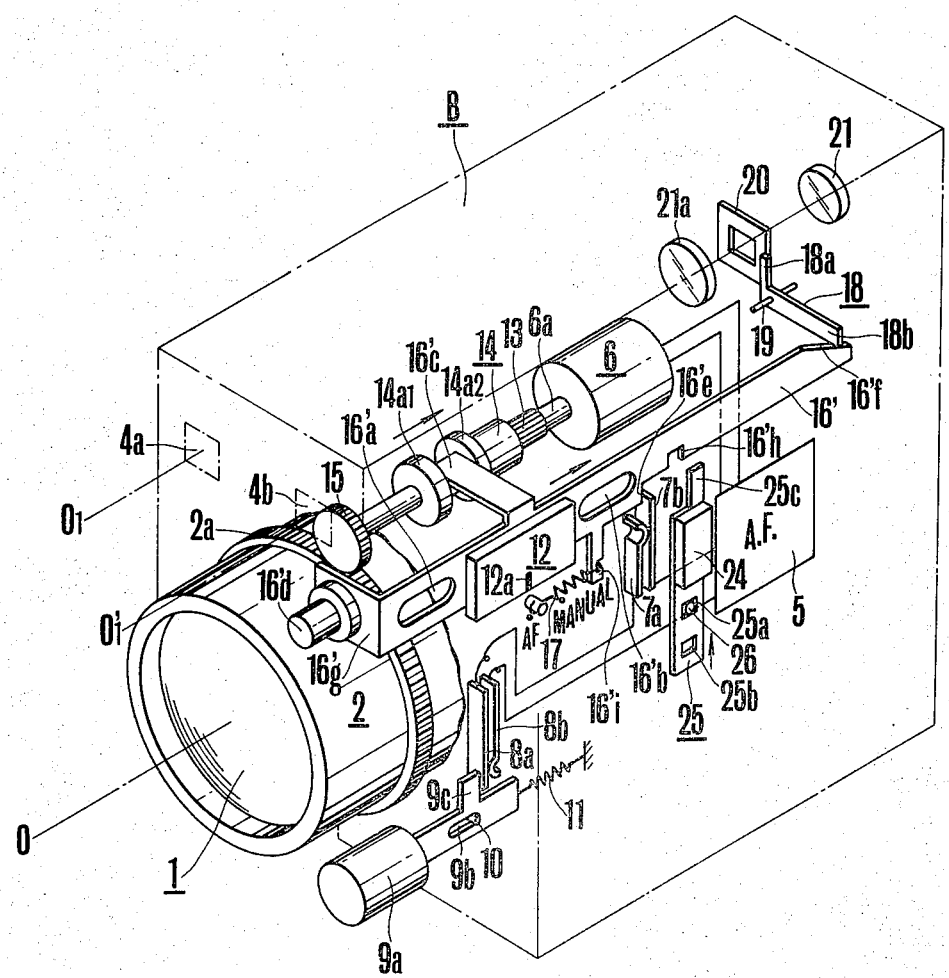
FIG. 5 is a similar view to that of FIG. 2 showing another embodiment of the present invention.

If the operator desires to perform the visual focusing of the camera without use of any optical accessory at the front of the photo-taking lens 1, he needs to exert a force necessary to retain the control element 12 in the "MANUAL" position during the entire picture taking period. To save the operator from the necessity of performing such task, another embodiment of the present invention shown in FIG. 5 provides a mechanism for latching the slide 16' in the manual focusing mode. This mechanism includes a plate 25 vertically movable within the housing B and having two stop holes 25a and 25b formed therein, vertically displaced from one another to cooperate with a click member 26, and a detent slot 16'h formed in a portion of the lower side of the slide 16 at such a location that when the slide 16 is moved to place the index 12a in registry with the symbol "M," the detent slot 16'h is aligned with a projection 25c of the plate 25. Fixedly mounted on the plate 25, is an knob 24 projecting through and outwardly beyond an opening in the side wall of the housing B to be accessible by the operator.

While retaining the focusing mode control knob element in the "M" position against the force of the spring 17, the operator will move the latching member 24 upwards from the most downward position where the click member 26 engages in the upper stop hole 25a to a position where it enters the lower stop hole 25b to hold the plate 25 stationary. In this manner, the projection 25c is brought into latching engagement with the slide 16' at the detent slot 16'h. Thus, the visual focusing of the photo-taking lens 1 can be performed without use of any optical accessory at the front thereof. To change the focusing of the camera from the manual to the automatic mode, the operator needs only to slide the member 24 downwardly. The slide 16' is automatically driven by the spring 17 to move forward until the index mark 12a points up the symbol "AF," as shown in FIG. 5.

Figure 6:
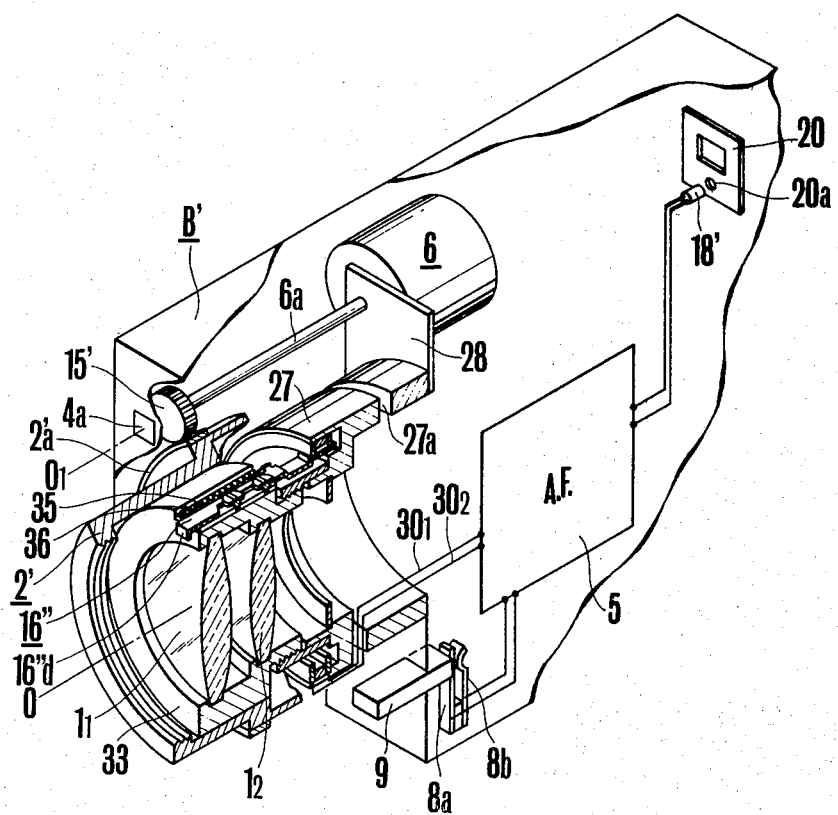
FIG. 6 is a schematic, partly perspective, partly sectional view showing still another embodiment of the present invention.
Figure 7:
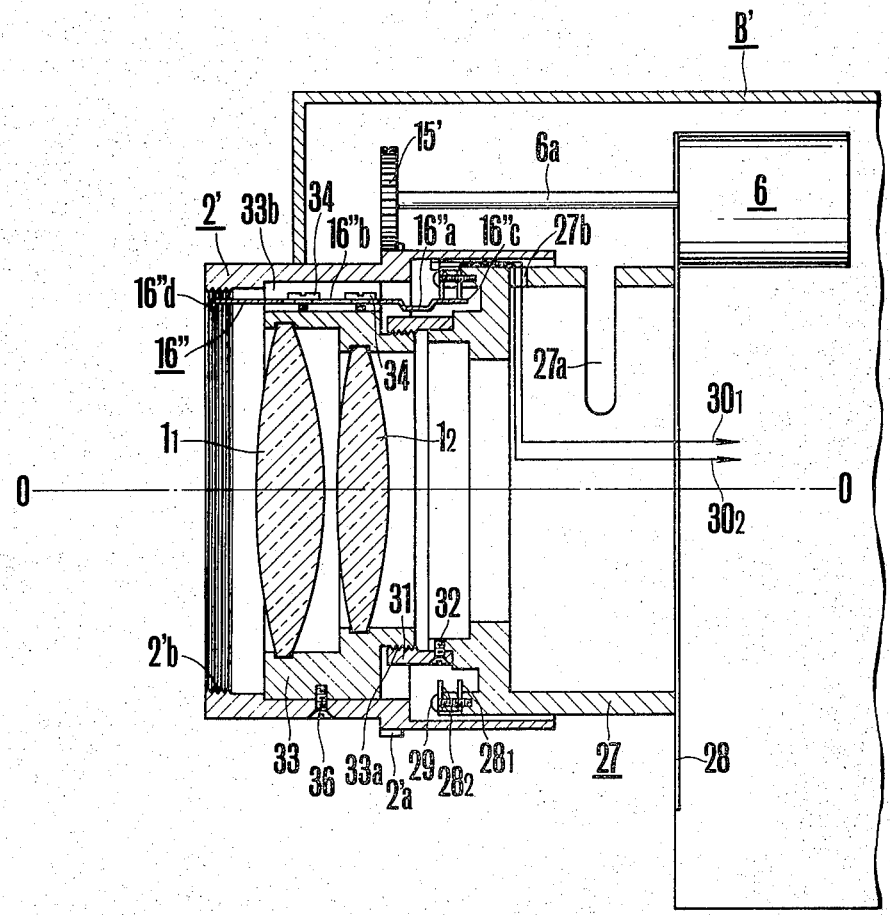
FIGS. 7 and 8 are sectional views of a focusing mode selector switch in two different operative positions without and with an attachment lens respectively.
Figure 8:
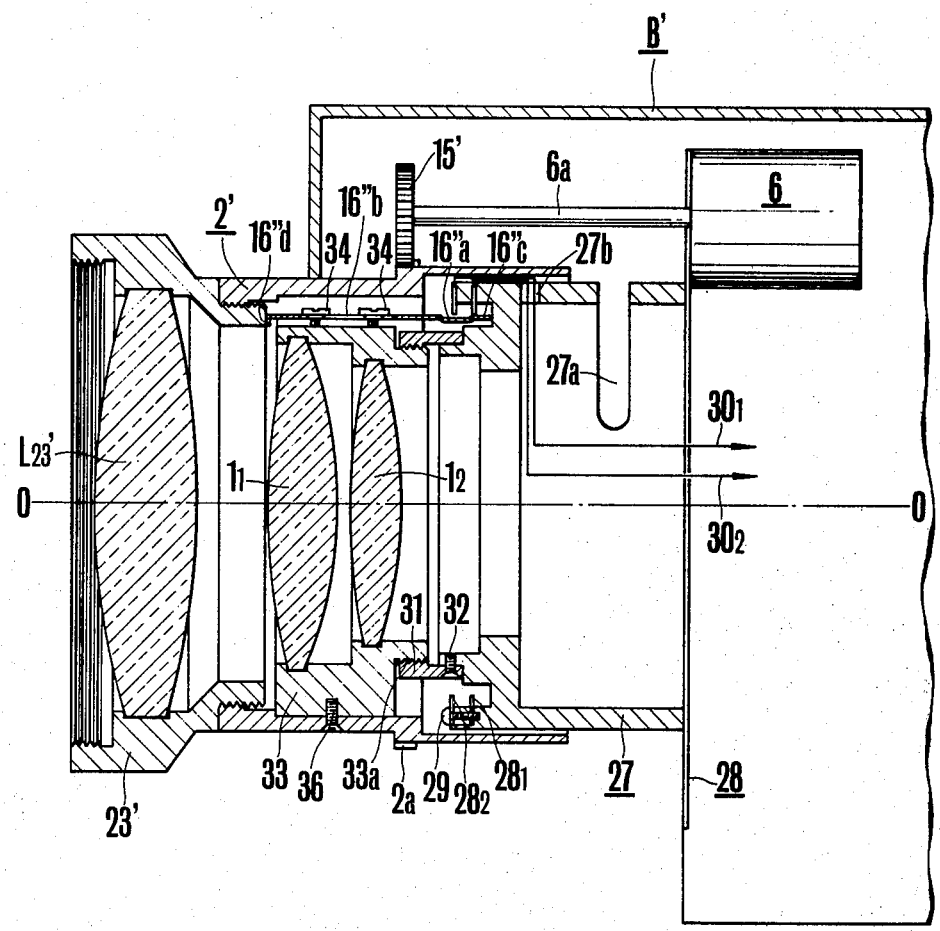

FIGS. 6 through 8 show a third embodiment of the present invention as modified in portions of the camera of FIGS. 1 through 5, wherein the same reference numerals have been employed to denote parts similar to those shown in FIGS. 1 through 4.

The photo-taking lens 1 is of the zoom type having front focusing members $1_1$ and $1_2$ fixedly secured in a lens cell 33. The rear end of the cell 33 is externally screw-threaded at 33a to engage an internal screw-threaded portion of a helicoid ring 31 which is fastened to a main tubular body 27 by screws 32. The tubular body 27 is fixedly mounted on the camera housing B' and has a circumferential slot 27a for assisting in movement of zoom control members of the photo-taking lens 1. The focusing lens cell 33 is longitudinally grooved at 33b to accommodate a slide 16" of electrically conductive material. The slide 16" is stepped down at a point 16"a near the rear end 16"c thereof so that when an optical accessory 23' is attached so as to be in front of a focusing ring 2' and is rotated through the full length of the tightening movement as shown in FIG. 8, the stepped or detent portion 16"a will be just below a first fixed contact $28_2$ of ring shape concentric to the optical axis of the photo-taking lens 1, while the rear end 16"c is allowed to contact with a second fixed contact $28_1$. In this manner, the first and second contacts $28_2$ and $28_1$ are electrically disconnected from each other since they are electrically insulated from each other. The parts 16"a, 16"c and 28 constitute a switch having a function equivalent to that of the switch 7 of FIG. 2. The switch 28 is connected by way of leads $30_1$ and $30_2$ passing through a hole 27b to the automatic sharp focus detection circuit 5.

When the accessory 23' is removed from the focusing ring 2', the slide 16" is driven by a tension spring 36 to move forwardly as it is guided by a pair of pin 34-and-slot 16"b connections, with the resulting position being shown in FIG. 7 where the two contacts $28_1$ and $28_2$ are electrically connected through the rear end 16"c of the slide 16". The establishment of this connection is maintained effective at any angular position of the focusing lens 33 since rotation of the focusing ring 2' by the gear 15' leads to the combination of rotational and axial movements of the cell 33, about and along the optical axis O—O of the photo-taking lens 1. A display element 18' is connected through the circuit 5 to the switch SW28 and is arranged in alignment with a round hole 20a formed in the framing aperture mask 20 at a point adjacent the field of view. When in the automatic focusing mode, the display element 18' is lighted either on or off.

By the depression of a release button 9, the camera without an optical accessory 23' is actuated to take motion pictures while permitting the auto-focusing device to control axial movement of the focusing lens members $1_1$ and $1_2$ through the reversible motor 6. Motor 6 has an output shaft 6a which is directly connected to the gear 15' which always engages the geared portion 2a' of the focusing ring 2 during the focusing. As the lens cell 33 is rotated along with the slide 16", the rear end 16"c of the slide is slidingly moved in contact with both of the internal edges of the rings or switch elements $28_1$ and $28_2$.

When the optical accessory 23' is mounted at the front of the focusing ring 2' as shown in FIG. 8, the rear face of the optical accessory 23' pushes the slide 16" at the front end 16"d thereof in the rearward direction against the force of the spring 35. In this manner, an air space is created between the slide 16" and at least the first electrical contact ring $28_2$ to prevent the autofocusing device from being actuated when the release button 9 is depressed. Since this occurrence is indicated by the display element 18', the operator is immediately aware of the necessity of manually operating the focusing ring 2' by the accessory 23' to assure the condition of sharpest focus of an image of an object being photographed on the film while looking through the finder 20. Upon removal of the accessory 23' from the focusing ring 2', the camera is automatically switched from the manual to the automatic focusing mode by returning the slide 16' to the position shown in FIGS. 6 and 7 under the action of the spring 35.

While the foregoing description and drawings represent the preferred embodiments of the present invention, it will be obvious to those skilled in the art that various changes and modifications may be made therein without departing from the true spirit and scope of the present invention.

What is claimed is:

1. A camera having a photo-taking lens mounting mechanism which is receptive of an optical accessory for effecting a change in focal length at the front end thereof, comprising:
    (a) a photo-taking lens mounting mechanism having:
        a photo-taking lens optical system;
        focusing adjusting means for performing focus adjustment of said photo-taking lens optical system, said focus adjusting means being manually operable; and
        coupling means for selectively mounting and demounting said optical accessory;
    (b) a view finder;
    (c) automatic focus adjustment means for automatically detecting a distance from the camera to an object to be photographed and for automatically controlling the operation of said focus adjusting means, said automatic focus adjustment means having:
        a distance measuring optical system arranged on an optical axis different from the optical axis of said photo-taking lens optical system;
        control circuit means responsive to a signal representative of the distance from said distance measuring optical system for producing a control signal; and
        drive means responsive to the control signal from said control circuit means for driving, said drive means being operatively connected to said focus adjusting means; and
    (d) detecting and changeover means responsive to the detection of the presence of said optical accessory at said coupling means for operatively excluding the operation of said automatic focus adjustment means, said detecting and changeover means including display means cooperative with the exclusion of the operation of said automatic focus adjustment means for indicating such exclusion in the field of view of said view finder.

2. A camera according to claim 1, wherein said detecting and changeover means have detection control means arranged to be moved in response to the coupling of said optical accessory on said photo-taking lens mounting mechanism, and to switch off the supply of electrical power for said control circuit means.

3. A camera according to claim 2, wherein a detecting portion of said detection control means is arranged outside the outer periphery of said photo-taking lens mounting mechanism.

4. A camera according to claim 2, wherein the detecting portion of said detection control means is arranged within said photo-taking lens mounting mechanism.

5. A camera according to claim 2, wherein said detecting and changeover means have release means cooperative with said detection control means upon said movement for selectively releasing the mechanical link between said focus adjusting means and said driving means.

6. A camera according to claim 1, wherein said optical accessory has a wide lens optical system.

7. A camera according to claim 1, wherein said optical accessory has a closeup lens optical system.

8. A camera having a photo-taking lens mounting mechanism receptive of an optical accessory for effecting a change in focal length at the front end thereof, comprising:
 (a) a camera body for holding a photo-taking lens mounting mechanism;
 (b) a photo-taking lens mounting mechanism having:
  a photo-taking lens optical system;
  focus adjusting means for performing focus adjustment of said photo-taking lens optical system, said focus adjusting means being manually operable; and
  coupling means for selectively mounting and demounting said optical accessory;
 (c) a view finder;
 (d) automatic focus adjustment means for automatically detecting a distance from the camera to an object to be photographed and for automatically controlling the operation of said focus adjusting means, said means being arranged in said body and having;
  a distance measuring optical system arranged on an optical axis entirely independent of the optical axis of said photo-taking lens;
  control circuit means responsive to a signal representative of the distance from said distance measuring optical system for producing a control signal; and
  drive means responsive to the control signal from said control circuit means for driving, said drive means being operatively connected to said focus adjusting means; and
 (e) detecting and changeover means having a detecting portion for detecting the presence of said optical accessory at said coupling means and being arranged upon movement by the coupling of said optical accessory to operatively exclude the operation of said automatic focus adjustment means, said detecting and changeover means having display means cooperative with the exclusion of the operation of the automatic focus adjustment means to indicate such exclusion in the field of view of the view finder.

9. A camera according to claim 8, wherein said detecting portion of said detecting and changeover means is arranged outside the outer periphery of said photo-taking lens mounting mechanism.

10. A camera according to claim 8, wherein said detecting portion of said detecting and changeover means is arranged within said photo-taking lens mounting mechanism.

11. A camera according to claim 9, wherein said detecting and changeover means have release means cooperative with said detection control means upon said movement for selectively releasing a mechanical link between said focus adjusting means and said driving means.

12. A camera according to claim 10, wherein said detecting and changeover means have detection control means cooperative with said movement of said detecting and changeover means for switching off a switch for the supply of electrical power for said control circuit means.

13. A camera according to claim 11, wherein said detecting and changeover means have detection control means responsive to release of said release means for switching off a switch for the supply of electrical power for said control circuit means.

* * * * *